United States Patent
Dunn et al.

(10) Patent No.: US 10,995,039 B1
(45) Date of Patent: May 4, 2021

(54) METHODS OF FORMING CERAMIC MATRIX COMPOSITES USING SACRIFICIAL FIBERS AND NON-WETTING COATING

(71) Applicant: General Electric Company, Schenectady, NY (US)

(72) Inventors: Daniel Gene Dunn, Guilderland, NY (US); Henry Charles McGuigan, Duanesburg, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/722,896

(22) Filed: Dec. 20, 2019

(51) Int. Cl.
*C04B 35/80* (2006.01)
*C04B 35/565* (2006.01)
*C04B 35/653* (2006.01)
*C04B 35/628* (2006.01)

(52) U.S. Cl.
CPC .......... *C04B 35/806* (2013.01); *C04B 35/565* (2013.01); *C04B 35/62849* (2013.01); *C04B 35/62852* (2013.01); *C04B 35/62878* (2013.01); *C04B 35/62894* (2013.01); *C04B 35/653* (2013.01); *C04B 2235/616* (2013.01); *F05D 2300/6033* (2013.01)

(58) Field of Classification Search
CPC ........ C04B 35/62844; C04B 35/62847; C04B 35/62849; C04B 35/62852; C04B 35/62855; C04B 35/62857; C04B 35/6286; C04B 35/62863; C04B 35/62865; C04B 35/62868; C04B 35/62871; C04B 35/62873; C04B 35/62878; C04B 35/62894
See application file for complete search history.

(56) References Cited

U.S. PATENT DOCUMENTS

| | | | |
|---|---|---|---|
| 4,356,152 A * | 10/1982 | Berkman | ................ C30B 15/10 117/211 |
| 4,496,671 A * | 1/1985 | Yoshinaga | ............... D01F 11/14 428/367 |
| 8,821,604 B2 | 9/2014 | Sani | |
| 9,797,263 B2 | 10/2017 | Varney et al. | |
| 10,024,175 B2 | 7/2018 | Varney | |
| 10,030,305 B2 | 7/2018 | Weaver et al. | |
| 10,138,168 B2 | 11/2018 | Shim | |
| 10,384,981 B2 | 8/2019 | Hall et al. | |
| 2016/0060115 A1* | 3/2016 | La Forest | ............... C04B 35/52 427/227 |

(Continued)

*Primary Examiner* — Nathan H Empie
(74) *Attorney, Agent, or Firm* — Dority Manning, P.A.

(57) ABSTRACT

Methods for preparing ceramic matrix composites using melt infiltration are provided as well as the resulting ceramic matrix composites. The methods and products include the incorporation of a non-wetting coating to one or more sacrificial fibers. The one or more sacrificial fibers are removed, such as decomposed during pyrolysis, resulting in the formation of a plurality of functional features, in the form of regular and elongate channels along the ceramic matrix composite. During the removing of the one or more sacrificial fibers, the non-wetting coating remains on an interior surface of the plurality of functional features to block infiltration of an infiltrant to the plurality of functional features and deposition thereon. Alternatively, the sacrificial fibers may be removed subsequent to melt infiltration.

21 Claims, 8 Drawing Sheets

(56) References Cited

U.S. PATENT DOCUMENTS

| | | | |
|---|---|---|---|
| 2016/0348511 A1* | 12/2016 | Varney | C04B 38/065 |
| 2017/0101348 A1* | 4/2017 | Wan | C04B 41/5006 |
| 2018/0371923 A1 | 12/2018 | Johnson et al. | |
| 2019/0185384 A1 | 9/2019 | Task et al. | |
| 2019/0284941 A1 | 9/2019 | Task et al. | |

* cited by examiner

METHODS OF FORMING CERAMIC MATRIX COMPOSITES USING SACRIFICIAL FIBERS AND NON-WETTING COATING

Methods of making ceramic matrix composites are generally provided, along with products made by such methods. In particular, ceramic matrix composite products formed by melt infiltration (MI).

BACKGROUND

Ceramic matrix composites ("CMCs") have high temperature capability and are light weight. The composites are thus an attractive material for various applications, such as for components in gas turbine engines where temperature durability and weight are important considerations. Current methods of preparing CMC products involve forming a laminate of ceramic fibers and a matrix, thermally treating the laminate, applying an infiltrant to the laminate, and densifying the laminate. The densified laminate may then be machined to prepare a CMC product with the desired dimensions and functional features, and more particularly, elongate channels, such as cooling channels. Alternatively, woven preforms can be used instead of laminates.

Of concern is the required post-infiltration machining and the difficulty encountered in machining preforms subsequent to melt infiltration. Of particular concern is the machining of functional features, such as cooling channels, into the melt infiltrated preform. Control of the size, shape, and number of these channels in a way that is reproducible is challenging. To overcome this challenge, the functional features may be formed during the lay-up and lamination of the preform, and prior to melt infiltration. Where these functional features are formed prior to melt infiltration, challenges arise in preventing the infiltrant must be from filling, such as by depositing on a surface, the functional features during melt infiltration.

Thus, an improved method of preparing ceramic matrix composites, and in particular the enabling of an improved method of forming functional features so as to prevent filling of the functional features with an infiltrant during melt infiltration is desirable in the art.

BRIEF DESCRIPTION

Aspects and advantages of the disclosure will be set forth in part in the following description, or may be obvious from the description, or may be learned through practice of the disclosure.

Methods are generally provided for forming a ceramic matrix composite (CMC) product, along with the resulting products formed from such methods. In one embodiment, the method includes depositing one or more coating layers, of which at least one is a non-wetting coating, on one or more sacrificial fibers to form one or more coated sacrificial fibers; forming a CMC preform comprising a matrix precursor, a plurality of reinforcing fibers and the one or more coated sacrificial fibers; performing one of: removing the one or more sacrificial fibers such that one or more functional features are formed along the CMC preform, wherein removing includes removing the one or more sacrificial fibers such that the non-wetting coating remains on the one or more functional features; or applying a fluid infiltrant to the CMC preform thereby densifying the CMC preform, and performing the other of: removing the one or more sacrificial fibers such that one or more functional features are formed along the CMC preform, wherein removing includes removing the one or more sacrificial fibers such that the non-wetting coating remains on the one or more functional features; or applying a fluid infiltrant to the CMC preform thereby densifying the CMC preform. The non-wetting coating is adapted to inhibit flow of the fluid infiltrant to the one or more functional features and deposition thereon, during melt infiltration.

In an alternate embodiment, the method includes depositing one or more coating layers, of which at least one is a non-wetting coating, on one or more sacrificial fibers; forming a CMC preform comprising a matrix precursor, a plurality of ceramic reinforcing fibers and the one or more coated sacrificial fibers; removing the one or more sacrificial fibers such that one or more elongate channels are formed along the CMC preform, wherein removing includes removing the one or more sacrificial fibers such that the non-wetting coating remains on an interior surface of the one or more elongate channels; and applying a fluid infiltrant to the CMC preform thereby densifying the CMC preform and forming the CMC product. The non-wetting coating is adapted to inhibit flow and deposition of the fluid infiltrant to the one or more elongate channels during melt infiltration.

In yet another embodiment, the method incudes forming a CMC preform comprising a matrix precursor, a plurality of ceramic reinforcing fibers and one or more sacrificial fibers having a coating comprised of boron nitride (BN) deposited thereon, wherein the one or more sacrificial fibers have an average diameter of about 10 µm to 1000 µm, wherein forming the CMC preform comprises forming the one or more sacrificial fibers in one of a woven pattern or nonwoven pattern; removing the one or more sacrificial fibers such that elongate channels are formed along the CMC preform, wherein removing includes removing the one or more sacrificial fibers such that the coating remains on an interior surface of the elongate channels; and applying a melt infiltrant comprised of one of a silicon or silicon alloy to the CMC preform thereby densifying the CMC preform and forming the CMC product. The coating is adapted to inhibit flow of the melt infiltrant to a cavity formed within each of the one or more elongate channels and deposition thereon, during the applying of the melt infiltrant.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended drawings, in which.

Repeat use of reference characters in the present specification and drawings is intended to represent the same or analogous features or elements of the embodiment shown.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, Hydrogen is represented by its common chemical abbreviation H; Helium is represented by its common chemical abbreviation He; and so forth.

As used herein, the "average particle diameter" or "average fiber diameter" refers to the diameter of a particle or fiber such that about 50% of the particles or fibers have a diameter that is greater than that diameter, and about 50% of the particles or fibers have a diameter that is less than that diameter.

As used herein, "substantially" refers to at least about 90% or more of the described group. For instance, as used herein, "substantially all" indicates that at least about 90% or more of the respective group have the applicable trait and "substantially no" or "substantially none" indicates that at least about 90% or more of the respective group do not have the applicable trait. As used herein, the "majority" refers to at least about 50% or more of the described group. For instance, as used herein, "the majority of" indicates that at least about 50% or more of the respective group have the applicable trait.

A ceramic matrix composite product (a "CMC product"), particularly a ceramic matrix composite product formed from melt infiltration, is generally provided herein, along with methods of forming such product. The CMC product is formed using coated sacrificial fibers that create elongated functional features for enhancing the function of the CMC, such as cooling channels, attachment (mounting) holes, sealing surfaces, and slots, in the CMC preform. The coated sacrificial fibers allow for an improved function of the CMC product.

The present CMC product and method of preparing the same using coated sacrificial fibers to introduce elongate functional features of desired diameter, spacing, and location into a CMC preform in a manner such that during subsequent melt infiltration the channels remain open and clear of infiltrant. During fabrication, one or more sacrificial fibers are initially coated with a non-wetting coating, to form the coated sacrificial fibers, wherein the coating remains within the functional features, subsequent to removal of the sacrificial fibers by a thermal process (e.g., melting, vaporizing, and/or decomposing) or a chemical process (e.g., dissolving into a solvent and/or chemical etching). In one embodiment, for example, the coated sacrificial fibers can be thermally decomposed to leave the coating layer on an interior surface of an elongate channels within the part. The diameter, position, volume fraction, and length of the sacrificial fibers as disclosed herein can provide the desired size, shape, and distribution of the elongate channels within the part. One or more sacrificial fibers may be used. The incorporation of the non-wetting coating during fabrication provides for the maintenance of open and clear elongate channels during the melt infiltration process.

As used herein, "elongate" refers to a body with an aspect ratio (length/width) of greater than 1. The use of the coated sacrificial fibers can be particularly beneficial for the fabrication of cooling channels in the CMC product. The coated sacrificial fibers may be introduced during the tape making and/or layup process of the product manufacturing process, and can be generally cylindrical bodies, including a variety of shapes, such as circular, elliptical, square, rectangular, flat ribbon, or the like, that are coated with a non-wetting coating. In certain embodiments, the coated sacrificial fibers are resistant to any solvent present in the tape making process and are able to survive consolidation, such as pressing or autoclave conditions (for example, temperatures of about 200° C. or less, such as about 50° C. to about 200° C.). In one embodiment, the sacrificial fibers decompose or pyrolyze to form the elongate functional features, and more particularly, elongate channels within the preform while leaving the non-wetting coating remaining on an interior surface of the elongate channels, such as under decomposition conditions at temperatures such as about 200° C. to about 650° C. However, in other embodiments, the sacrificial fibers may be removed by other thermal methods (e.g., melting, vaporizing, etc.) or chemical methods (e.g., dissolving into a solvent and/or chemical etching). In addition, in other embodiment, the sacrificial fibers may be removed by physical methods, such as by extraction.

The elongate channels formed by the method disclosed herein provide a pathway for gas to escape during the pyrolysis or burnout process. To provide such escape the channels may terminate at a free surface. In addition, the elongate channels formed by the method disclosed herein may also provide a pathway for gas to escape during the infiltration process. Gas may evolve from preforms at infiltration temperatures. If the gas does not have a way to escape, pressure can build in the preform, which may result in bubbles or other voids/pockets in the resulting CMC. The use of sacrificial fibers of the present disclosure may prevent the increase in pressure by providing a path for gas to escape the preform.

The coated sacrificial fibers may be introduced during the tape making or, alternatively, in the lay-up process. The coated sacrificial fibers may be disposed as single strands, woven or nonwoven mats, continuous grids (e.g., continuous in two dimensions and a single layer), or various other configurations as well as combinations thereof. The coated sacrificial fibers are generally resistant to solvents present in the tape making process and have enough thermal integrity to resist flow during the consolidation process. The coated sacrificial fibers also generally do not decompose at temperatures present in the consolidation process; however, the sacrificial fibers themselves, decompose during the burnout process prior to melt infiltration. Alternatively, the coated sacrificial fibers may be formed to decompose subsequent to melt infiltration. The composition of the sacrificial fibers may be chosen to burn out as clean as possible and target a minimal char yield to provide the desired structure of the elongate channels and more particularly, so as to form a channel with as minimal amount of residue left behind.

Solvent and temperature resistance may be imparted through the use of a semi-crystalline polymer fiber with an elevated melting point, through the use of a cross-linked polymer fiber, through the judicious choice of the composition of an amorphous polymer or polymer blend, through use of combinations thereof, or through other modifications to provide the desired elongate channels and resulting CMC product. For instance, the sacrificial fibers may include crosslinked phenolic resin (e.g., Kynol®), which may have a decomposition temperature of about 600° C.; crosslinked poly(vinyl butyral); polyamides such as nylon 6,6, which may have a melting temperature of about 265° C. and a decomposition temperature of about 400° C.; polyester fiber, which may have a melting temperature of about 250° C. and a decomposition temperature of about 400° C.; an acrylic fiber, which may have a melting temperature of about 160° C. and a decomposition temperature of about 400° C., and combinations thereof.

CMC preforms may be prepared with a slurry that includes reinforcing fibers and the coated sacrificial fibers. The slurry may also include one or more solvents, particulates, or other suitable materials. The preform may undergo autoclaving followed by pyrolysis and decomposition of the sacrificial fibers. An infiltrant may then be added to densify the CMC preform and form the CMC product. Alternatively, the infiltrant may be introduced prior to decomposition of the sacrificial fibers. With the incorporation of the coated sacrificial fibers and subsequent formation of elongate channels from decomposition of the sacrificial fibers while leaving the coating adhered to an interior surface of the elongate channels, the infiltrant is able to infiltrate the preform without blocking or adhering to an interior of the elongate channels, thus forming elongate channels that remain open and clear.

The present method can be used to prepare a variety of components comprising ceramic matrix composites. For instance, the present method may be used to prepare components in the aviation industry. The present method may be used to prepare components for gas turbine engines, such as in high pressure compressors (HPC), fans, boosters, high pressure turbines (HPT), and low pressure turbines (LPT) of both airborne and land-based gas turbine engines. For instance, the present method may be used to prepare components for a turbofan engine or turbomachinery in general, including turbojet, turboprop and turboshaft gas turbine engines, including industrial and marine gas turbine engines and auxiliary power units. For instance, components such as combustion liners, shrouds, nozzles, blades, etc. may be prepared with the present method and materials.

CMC materials of particular interest to the disclosure are silicon-containing, or oxide containing matrix and reinforcing materials. Some examples of CMCs acceptable for use herein can include, but are not limited to, materials having a matrix and reinforcing fibers comprising non-oxide silicon-based materials such as silicon carbide, silicon nitride, silicon oxycarbides, silicon oxynitrides, silicides, and mixtures thereof. Examples include, but are not limited to, CMCs with a silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. Specifically, the oxide-oxide CMCs may be comprised of a matrix and reinforcing fibers comprising oxide-based materials such as aluminum oxide ($Al_2O_3$), silicon dioxide ($SiO_2$), yttrium aluminum garnet (YAG), aluminosilicates, and mixtures thereof. Aluminosilicates can include crystalline materials such as mullite ($3Al_2O_3$ $2SiO_2$), as well as glassy aluminosilicates. Other ceramic composite materials that are not comprised of either silicon or oxygen may be used, including carbon, zirconium carbide, hafnium carbide, boron carbide, or other ceramic materials, alone or in combination with the materials noted above.

FIG. 1-8 are schematic views of an exemplary method of forming a CMC product in accordance with one embodiment of the present disclosure. In particular, FIGS. 1-8 illustrate various stages of forming a CMC product in accordance with one embodiment of the present disclosure. Various combinations of these stages may be performed and not all of the stages may be performed in the method.

Figure 1:
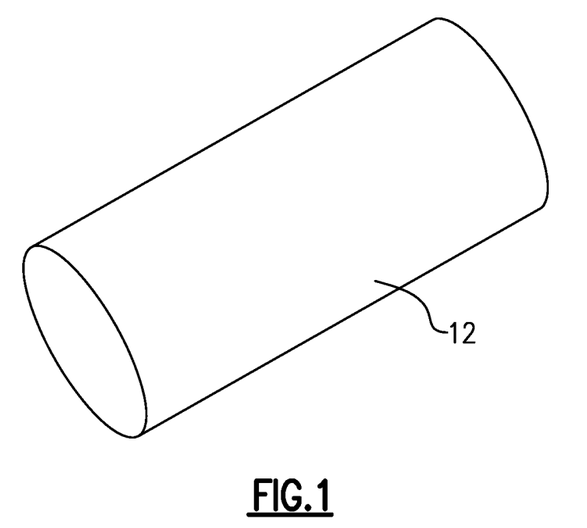
FIG. 1 is a schematic view of a sacrificial fiber in accordance with one embodiment of the present disclosure.

FIG. 1 illustrates a single sacrificial fiber 12 for use in the CMC product disclosed herein. The sacrificial fiber 12 may include fibers comprised of a material that is stable in a slurry (i.e. fibers are incorporated during the drum winding of the fibers and slurry) or a prepreg tape (i.e. fibers are incorporated subsequent to drum winding of the fibers and slurry), can withstand compression and heating, and decompose during the decomposition/pyrolysis stage. In some embodiments, the sacrificial fiber 12 should have a decomposition temperature or melting point at or lower than the temperature at which decomposition/pyrolysis is performed. For instance, the one or more sacrificial fibers 12 may have a decomposition temperature of about 200° C. to about 700° C., such as about 200° C. to about 600° C., or about 400° C. to about 600° C. Suitable sacrificial materials for the sacrificial fiber 12 may include polymers such as semi-crystalline polymers, cross-linked polymers, amorphous polymers, or combinations thereof, such as crosslinked phenolic resin, crosslinked poly(vinyl butyral), polyamides, polyesters, and combinations thereof. In certain embodiments, low melting point metals or reactive metals that can be etched via liquid or gases may be used as the sacrificial fiber 12 alone or in combination with any of the aforementioned sacrificial materials. While in the embodiment illustrated in FIGS. 1-7 the sacrificial fibers 12 may generally be comprised of the same material, the sacrificial fibers 12 of a single ply may vary in composition and/or the sacrificial fibers 12 may vary in composition across multiple plies. The sacrificial fibers 12 are generally continuous in a single ply. That is, each of the sacrificial fibers 12 is generally a continuous strand across the ply as opposed to fragments of fibrous material. In other embodiments, it may be desired to form sacrificial fibers 12 of both continuous strands and fragments, while in other embodiments it may be desired to form sacrificial fibers 12 of fragments only. In certain embodiments, the sacrificial fibers 12 have an aspect ratio such that each sacrificial fiber traverses the substantial length or width of the ceramic preform (describe presently) as a continuous fiber.

Figure 2:
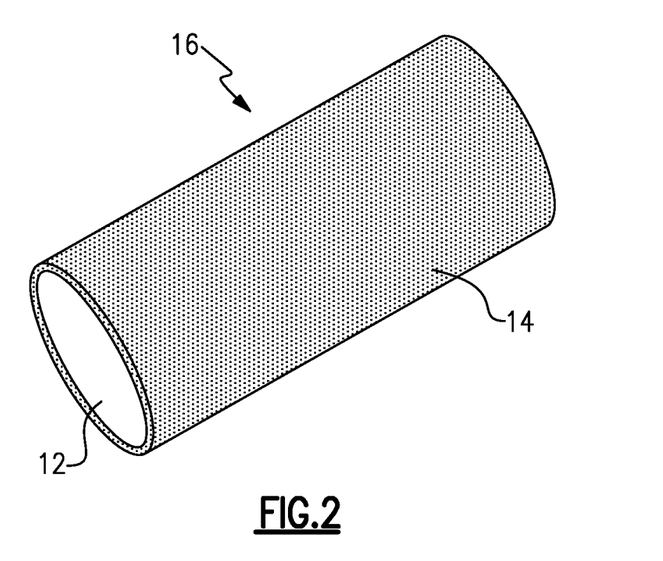
FIG. 2 is a schematic view of the sacrificial fiber of FIG. 1, having a non-wetting coating disposed thereon, in accordance with one embodiment of the present disclosure.

FIG. 2 illustrates the sacrificial fiber 12, subsequent to coating with a non-wetting coating 14, referred to herein in combination as a coated sacrificial fiber 16. In particular embodiments, the non-wetting coating 14 is adapted to inhibit the flow of a liquid material to a functional feature (described presently) during melt infiltration, and/or subsequent deposition on the functional feature. In an embodiment, the non-wetting coating may be applied to the one or more sacrificial fibers 12 by any of painting, spraying, depositing, dipping or sputtering of an infiltrant stop off material on the one or more sacrificial fibers 12. In an embodiment, the non-wetting coating 14 is comprised of a silicon stop off material selected based on the chosen infiltrant. In the illustrated embodiment, the non-wetting coating 14 comprises a material selected from the group consisting of a boron (e.g., a boron nitride), an oxide, such as silicon dioxide ($SiO_2$), boron trioxide ($B_2O_3$), aluminum oxide $Al_2O_3$, or combinations thereof of the oxides and boron nitride. In an embodiment, the non-wetting coating 14 is comprised of boron nitride (BN) and the infiltrant is comprised of silicon. The thickness of the non-wetting coating 14 is dependent on the diameter of the resultant functional feature, with a larger diameter featuring including a thicker non-wetting coating 14. In an embodiment, the non-wetting coating 14 thickness is preferably approximately 10% of a resultant functional feature diameter. In an embodiment, a nominal feature diameter may range from 250-1000 µm and have a non-wetting coating 14 thickness ranging from 25-100 µm. In an alternate embodiment, where the functional feature serves as a plenum, or the like, the feature diameter may be larger and incorporate a thicker non-wetting coating 14.

Figure 3:
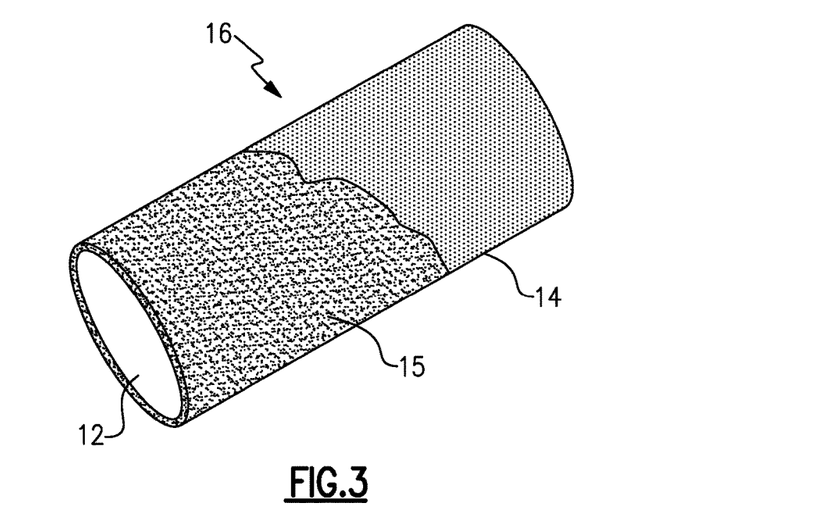
FIG. 3 is a schematic view of an alternate embodiment of the sacrificial fiber of FIG. 1, having a sacrificial polymer coating and a non-wetting coating disposed thereon, in accordance with one embodiment of the present disclosure.

FIG. 3 illustrates an alternate embodiment of the coated sacrificial fibers 16, including a sacrificial fiber 12, and a plurality of coating layers, comprising a sacrificial polymer coating 15 and a non-wetting coating 14. In the illustrated embodiment, a portion of the non-wetting coating 14 is shown as removed for illustrative purposes. More particularly, in this particular embodiment, the sacrificial fiber 12 is formed of a metal and the sacrificial polymer coating 15 is provided on an exterior surface to aid in subsequent removal of the sacrificial fiber 12 as described herein. As in the embodiment of FIG. 2, the non-wetting coating 14 is adapted to inhibit the flow of a liquid material to a functional feature (described presently) during melt infiltration. In an embodiment both the sacrificial polymer coating 15 and the non-wetting coating 14 may be applied as coating layers to the one or more sacrificial fibers 12 by any of painting, spraying, depositing, dipping or sputtering of the material. In an alternate embodiment, the sacrificial polymer coating 15 is in the form of tubing into which the sacrificial fiber 12 is disposed and the non-wetting coating 14 is applied to an exterior surface of the tubing. In the illustrated embodiment, the sacrificial polymer coating 15 comprises a polymer such as a semi-crystalline polymer, cross-linked polymer, amorphous polymer, or combinations thereof, such as crosslinked phenolic resin, crosslinked poly(vinyl butyral), polyamides, polyesters, and combinations thereof. Similar to the embodiment of FIG. 2, the non-wetting coating 14 comprises a material selected from the group consisting of a boron (e.g., a boron nitride), an oxide, such as silicon dioxide ($SiO_2$), boron trioxide ($B_2O_3$), aluminum oxide $al_2O_3$, or combinations thereof of the oxides and boron nitride. In an embodiment, the sacrificial polymer coating 15 is comprised of polyamide, the non-wetting coating 14 is comprised of boron nitride (BN) and the infiltrant is comprised of silicon. The thickness of the both the sacrificial polymer coating 15 and the non-wetting coating 16 are dependent on the diameter of the resultant functional feature, with a larger diameter featuring including thicker coatings.

In an alternate embodiment, the sacrificial polymer coating 15 may be disposed on an exterior surface of the non-wetting coating 14. More specifically, the coated sacrificial fiber 16 is formed according to the embodiment of FIG. 2, and further includes a sacrificial material coating 15 disposed on an exterior surface of the non-wetting coating 14.

In an embodiment, the sacrificial polymer coating 15 is comprised of a material having a decomposition temperature less than a decomposition temperature of the sacrificial fiber 12. In an embodiment, the sacrificial polymer coating 15 is comprised of a material having a decomposition temperature of less than 200° C. and the sacrificial fibers 12 are comprised of a material having a decomposition temperature between 200° C. and 700° C.

Figure 4:
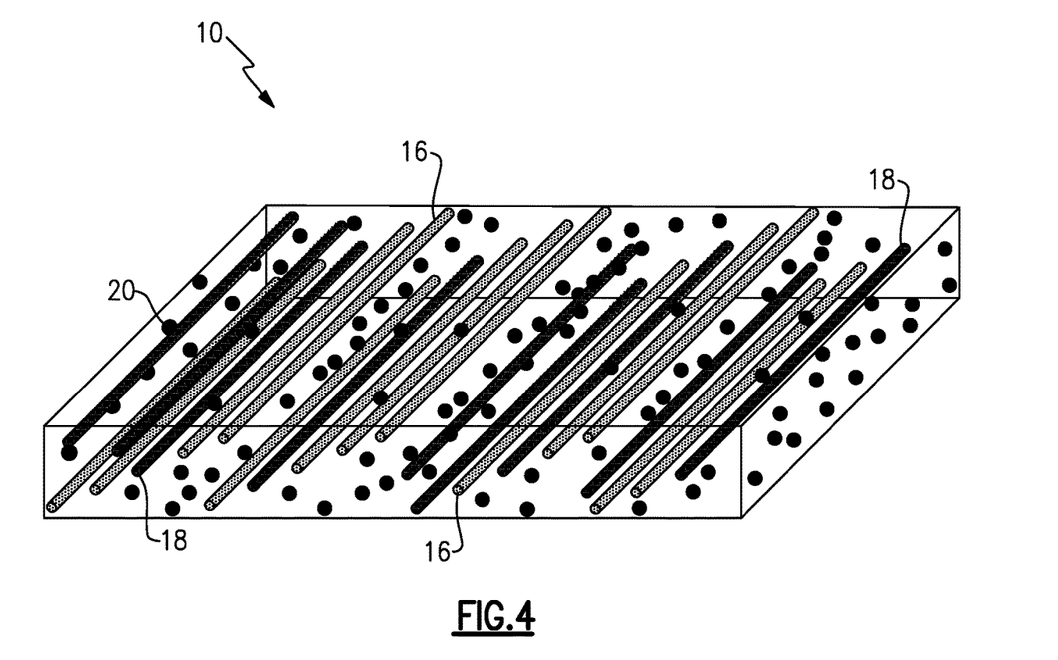
FIG. 4 is a schematic view of a CMC preform after forming with a slurry, in accordance with one embodiment of the present disclosure.

FIG. 4 illustrates introduction of the reinforcing fibers 18, and the plurality of coated sacrificial fibers 16 with a slurry 20. In an embodiment, the slurry 20 is generally comprised of a suspension of particulates and resins in a carrier liquid. In an alternate embodiment, the one or more sacrificial fibers 16 may be introduced at a later stage, where the sacrificial fibers are incorporated subsequent to drum winding of the fibers and slurry. FIG. 4 illustrates a unidirectional ply (e.g., the reinforcing fibers within each ply are generally disposed in a parallel direction relative to each other). When substantially all of the reinforcing fibers 18 within a single ply are disposed in a parallel direction relative to each other, the ply may be referred to as "unidirectional." In some embodiments, at least one reinforcing fiber 18 in each layer is disposed in a perpendicular direction relative to another reinforcing fiber 18 within the respective layer. When substantially all of the reinforcing fibers 18 within a single ply are disposed in a parallel direction or a perpendicular direction such that the fibers are woven, the ply may be referred to as "cross-woven." Multiple layers or "plies" may be used with each ply oriented in various directions (e.g., third, fourth, and fifth directions, etc.). For instance, a first ply may have reinforcing fibers oriented in a first direction and a second ply may have reinforcing fibers oriented in a second direction. The first direction may be positioned in any orientation with respect to the second direction, such as about 0° to about 90°, such as about 45°. While FIGS. 4-8 show an embodiment with a unidirectional ply, the present method and materials can be used with a single unidirectional, cross-woven, or nonwoven ply, or multiple unidirectional, cross-woven, and/or nonwoven plies with plies layered in a variety of orientations, or in a multidirectional weave or braid. As used herein, "nonwoven" generally refers to the unordered disposition of fibers such as in a web with fibers disposed in a variety of orientations and configuration. Various configurations can be used without deviating from the intent of the present disclosure.

The reinforcing fibers 18 may be any suitable fibers that provide reinforcement for the resulting CMC product and may comprise any of the CMC materials set forth herein. The reinforcing fibers 18 may be more specifically referred to as ceramic reinforcing fibers 18. While in the embodiment illustrated in FIGS. 4-8 the reinforcing fibers 18 may generally be comprised of the same material, the reinforcing fibers 18 of a single ply may vary in composition and/or the reinforcing fibers 18 may vary in composition across multiple plies.

In certain embodiments, the reinforcing fibers 18 may have at least one coating thereon. In particular embodiments, the at least one coating can have a layer selected from the group consisting of a nitride layer (e.g., a silicon nitride layer), a carbide layer (e.g., a silicon carbide layer), a boron layer (e.g., a boron nitride layer), a carbon layer, and combinations thereof. For example, the at least one coating can be deposited as a coating system selected from the group consisting of a nitride coating and a silicon carbide coating; a boron nitride, a carbide, and a silicon nitride coating system; a boron nitride, a silicon carbide, a carbide, and a silicon nitride coating system; a boron nitride, a carbon, a silicon nitride and a carbon coating system; and a carbon, a boron nitride, a carbon, a silicon nitride, and a carbon coating system; and mixtures thereof. If present, the coating thickness can be about 0.1 micrometer (μm) to about 4.0 μm.

The reinforcing fibers 18 are generally continuous in a single ply. That is, each of the reinforcing fibers 18 is generally a continuous strand across the ply as opposed to fragments of fibrous material. The reinforcing fibers 18 may have any suitable diameter or length to provide the desired ceramic product. In some embodiments, the reinforcing fibers 18 may have a diameter of about 5 μm to about 20 μm, such as about 7 μm to about 14 μm. In some embodiments, the reinforcing fibers 18 may be considered monofilaments and have an average diameter of about 125 μm to about 175 μm, such as about 140 μm to about 160 μm.

The slurry 20 may include various components such as one or more solvents, particulates (e.g., silicon, polymers, silicon carbide, carbon), and combinations thereof. For instance, the slurry 20 may include various matrix precursor materials of the CMC materials set forth herein. In some embodiments, it may be beneficial to include surfactants, dispersing agents, and/or other components in the slurry, as well as matrix precursor material for the ceramic matrix.

As shown in FIG. 4, in this embodiment, the one or more coated sacrificial fibers 16 are disposed in a substantially parallel direction in relation to each other. In an alternate embodiment, the one or more coated sacrificial fibers 16 are disposed in a manner where they are not in parallel direction in relation to each other (i.e. radially oriented, perpendicular, random configuration, etc.). More particularly, the one or more coated sacrificial fibers 16 may be disposed in various directions with respect to each other and may be disposed without a particular orientation, similar to a nonwoven configuration. The one or more coated sacrificial fibers 16 may be woven to form a woven mat or grid while forming the CMC preform 10 and/or may be woven prior to incorporation into the CMC preform 10. When used in a multidirectional weave or braid, the sacrificial fibers may be oriented both in-plane and out-of-plane. In an embodiment, the one or more coated sacrificial fibers 16 may be coupled in a manner to aid in positioning while forming the CMC preform 10, wherein such coupling structure is not included within the CMC preform 10. Such coupling configuration may include a one or more shaped sacrificial fibers, such as by casting in a mold or 3-D printing, (could be cast in a mold or 3D printed).

In a preferred embodiment, the one or more coated sacrificial fibers 16 are configured in a manner in which the resultant elongate functional features, and more particularly the cooling channels, are desired (i.e. line-of-sight functional features, non-line-of-sight functional features). Such configuration of the resultant elongate channels may include, but is not limited to straight channels that are parallel to one another, straight channels that are not parallel to one another, curved channels that remain in the plane of the ply (non-line-of-sight) or have curvature similar to the fiber plies (non-line-of-sight). The one or more coated sacrificial fibers 16 may be included in various amounts relative to the CMC preform 10. For instance, the one or more coated sacrificial fibers 16 may be included in an amount of about 0.1% by volume to about 20% by volume, such as about 1% by volume to about 15% by volume, about 1% by volume to about 10% by volume, or about 1% by volume to about 7% by volume of the CMC preform 10.

The CMC preform 10 may be prepared in a variety of ways. In some embodiments, the reinforcing fibers 18 and the one or more coated sacrificial fibers 16 may be introduced into the slurry 20 and any other additional desired components to form one or more plies. In alternate embodiments, the one or more coated sacrificial fibers 16 may be introduced subsequent to formation of a prepreg tape.

In one embodiment, once the slurry is combined with the reinforcing fibers 18 and the one or more coated sacrificial fibers 16 it may be wound on a drum roll to form a prepreg tape and then cut into plies. Alternatively, the one or more coated sacrificial fibers 16 may be introduced at a later stage, previously described where the sacrificial fibers are incorporated subsequent to drum winding of the fibers and slurry. One or more plies may be layered with the plies having various relative orientations. For instance, one or more plies may be cross-plied or layered directly over each other such that the fibers are oriented in the same direction. The configuration of the fibers in the tapes and the configuration of the plies may be modified depending on the desired CMC product and desired mechanical properties of the CMC product. In other embodiments, the slurry can be introduced to the fibers via tape casting, screen printing, or any other suitable method. The reinforcing fibers 18 and the one or more coated sacrificial fibers 16 within the composite may be unidirectional, cross-woven, and/or nonwoven. The slurry 20 and method of introducing the slurry 20 to the reinforcing fibers 18 and the one or more coated sacrificial fibers 16 may be modified depending on the orientation of the reinforcing fibers 18 and the one or more coated sacrificial fibers 16.

Figure 5:
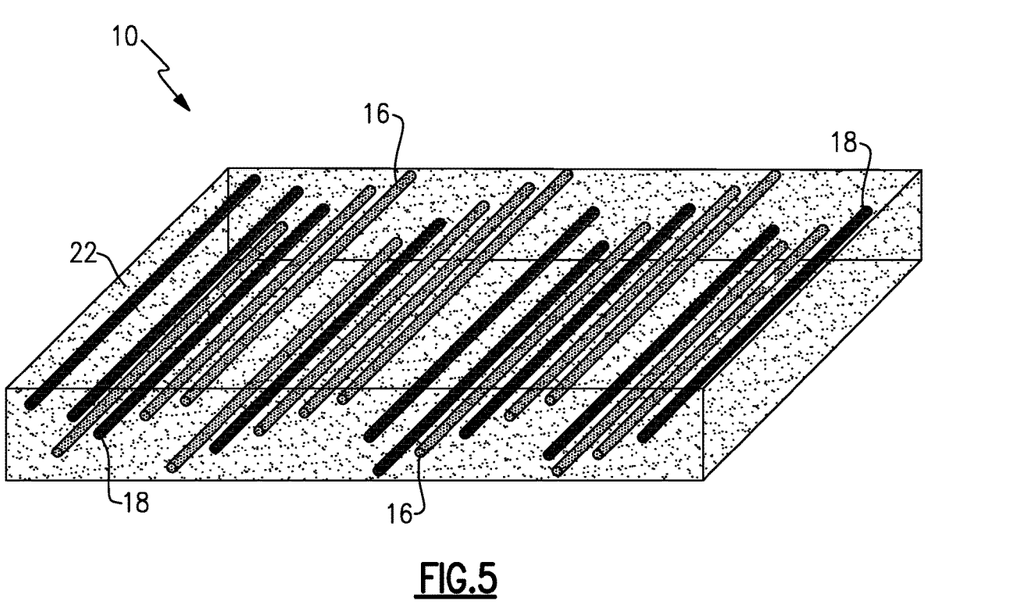
FIG. 5 is a schematic view of a CMC preform after heating and compacting the preform, in accordance with one embodiment of the present disclosure.

FIG. 5 illustrates the CMC preform 10 after lamination and consolidation, such as by heating and/or compacting. The CMC preform 10 includes the reinforcing fibers 18, the one or more coated sacrificial fibers 16, and a matrix precursor material 22. The heat and/or compacting action removes some or all of the solvent of the slurry 20 (FIG. 3) leaving the matrix precursor material 22 of the slurry 20. The matrix precursor material is prepared such that the one or more coated sacrificial fibers 16 are stable during the heating and compacting stage. For instance, the heating and compacting stage may be performed at a temperature of about 200° C. or less.

Figure 6:
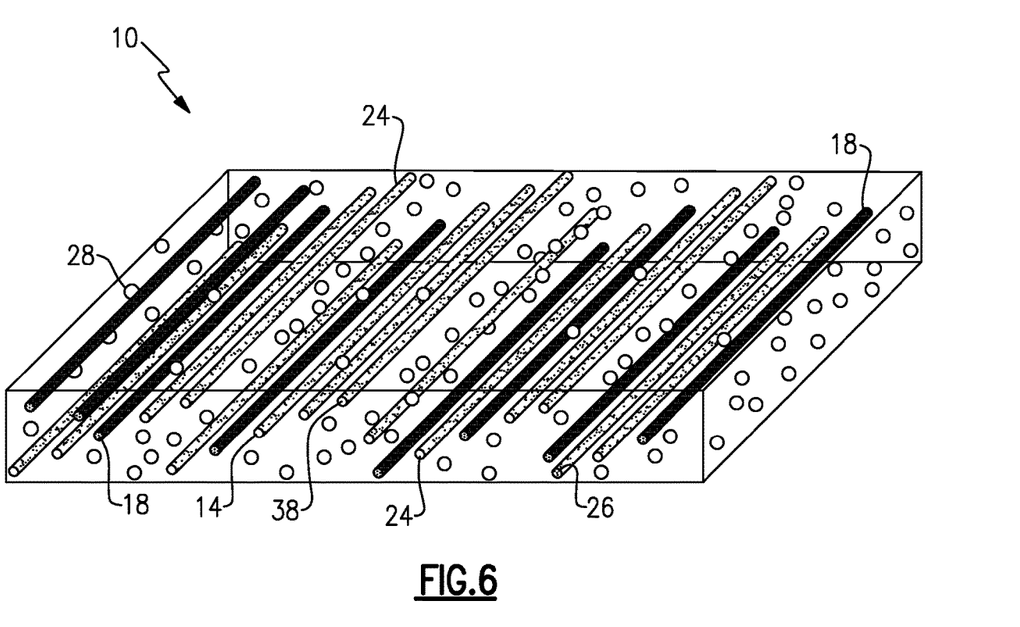
FIG. 6 is a schematic view of a CMC preform after removing some or all of the sacrificial fibers, in accordance with one embodiment of the present disclosure.

FIG. 6 illustrates an exemplary CMC preform 10 after removing some or all of the one or more the sacrificial fibers 12, such as through decomposition, physical extraction, or the like. Removal of some or all of the sacrificial fibers 12 results in the formation of elongate functional features, or channels, 24 along the CMC preform 10, defining a cavity 38 therein, while leaving the non-wetting coating 14 adhered to an interior surface 26 of the one or more elongate channels 24. Some or all of the matrix precursor material 22 may also be removed forming pores 28 in the CMC preform 10. In the embodiment illustrated in FIG. 5, pores 28 are disposed along the CMC preform 10. The distribution of the pores 28 may vary and may be controlled to provide a desired porosity in the CMC preform 10. Decomposition of the one or more sacrificial fibers 12 may occur at temperatures of about 200° C. to about 700° C., such as about 200° C. to about 650° C., or about 400° C. to about 600° C. The decomposition atmosphere may be oxidizing, reducing, inert, or vacuum. The reinforcing fibers 18 are maintained in the CMC preform 10.

The elongate channels 24 are generally continuous hollow channels formed in the CMC preform 10. The elongate channels 24 are sufficiently sized to allow the flow of a cooling fluid therethrough, and may generally be considered cylindrical hollow channels with a higher length than diameter/width. When substantially all of the one or more sacrificial fibers 12 decompose and the non-wetting coating 14 is left remaining on the interior surface 26 of the elongate channels 24, the elongate channels 24 may have substantially the same size and distributions (for example, the same volume % and aspect ratio) as that of the one or more sacrificial fibers 12. As previously described, the resultant elongate channels 24 may include, but is not limited to, line-of sight configurations and non-line of sight configurations, such as straight channels that are parallel to one another, straight channels that are not parallel to one another, curved channels that remain in the plane of the ply (non-line-of-sight) or have curvature similar to the fiber plies (non-line-of-sight).

Figure 7:
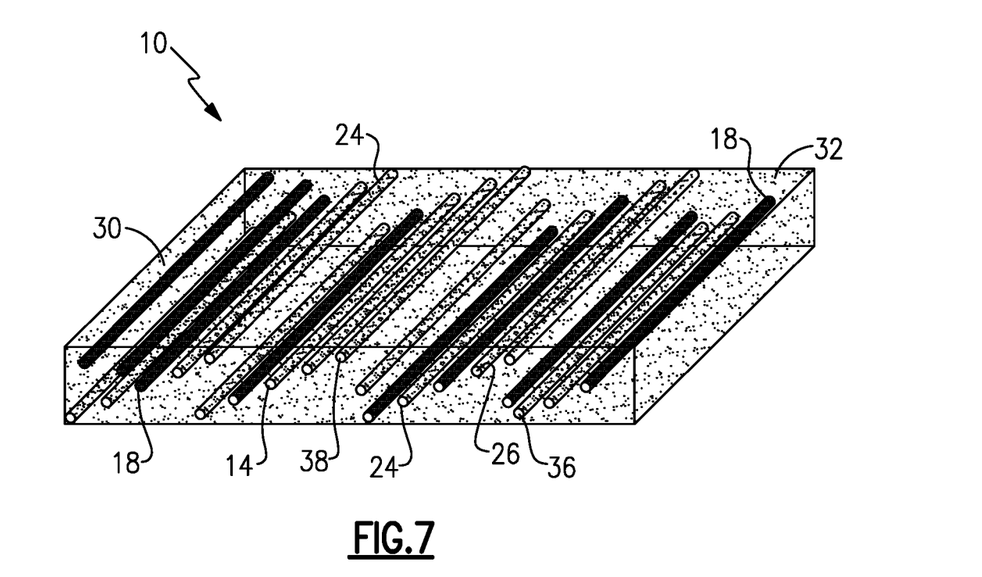
FIG. 7 is a schematic view of a CMC preform after infiltration of an infiltrant, in accordance with one embodiment of the present disclosure.

FIG. 7 illustrates a CMC preform 10 subsequent to infiltration of an infiltrant 30. The infiltrant 30 fills pores 28 in the preform 10 forming an infiltrated matrix 32. The non-wetting coating 14 remaining on the interior surface 26 of the elongate channels 24 minimizes, if not eliminates, the filling and/or deposition of the infiltrant 30 on the interior surface 26 and within one or more cavities 38 defined by the elongate channels 24.

The infiltrant 30 may be disposed in the pores 28 to increase the density of the final CMC product. The infiltrant 30 can be any of the various materials used in ceramic matrix composite processing. Examples of suitable infiltrants include molten material, such as silicon or silicon alloy, for melt infiltration.

Figure 8:
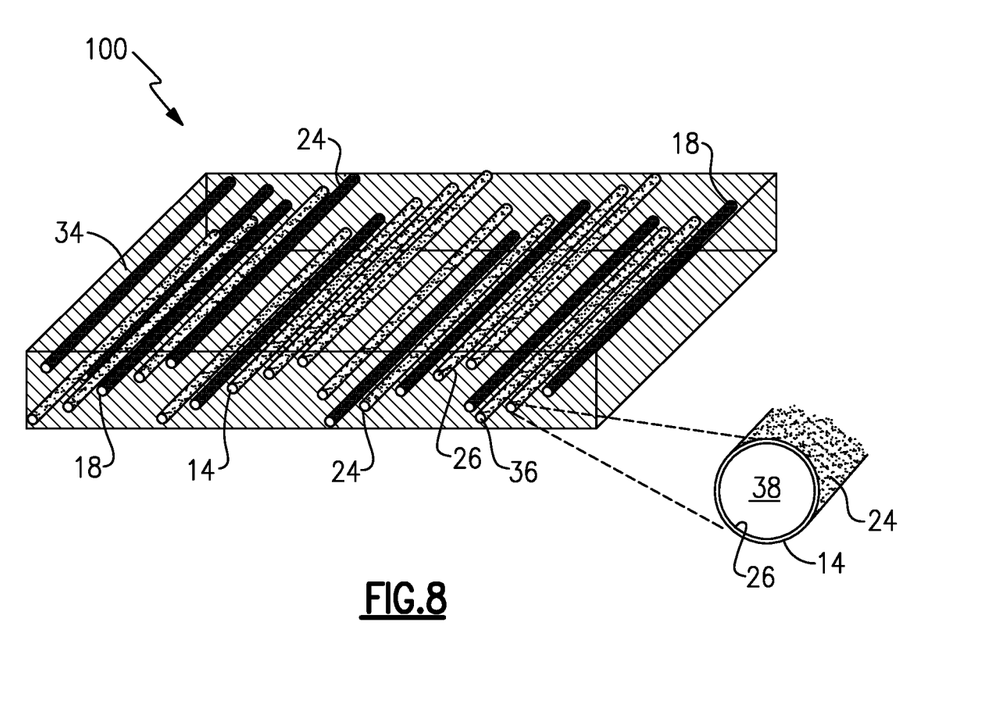
FIG. 8 is a schematic view of the CMC product, in accordance with one embodiment of the present disclosure.

FIG. 8 illustrates the final CMC product 100. Infiltration of the CMC preform 10 with the infiltrant forms a densified CMC product 100 having formed therein a plurality of elongate channels 24, and more particularly, a plurality of cooling channels 36. Illustrated in FIG. 8 is an enlargement of a portion of a single elongate channel 24, illustrating the interior surface 26 having the non-wetting coating 14 remaining thereon and defining the cavity 38. In some embodiments, multiple infiltration stages may be performed to obtain the CMC product 100. In some embodiments, infiltration may take place prior to removing of the one or more sacrificial fibers 16. After infiltration, the CMC product 100 may be further densified, heated to anneal, cooled, machined, inspected, or combinations thereof. In some embodiments, an external coating may be applied. In some embodiments, subsequent to melt infiltration, the non-wetting coating 14 may be removed by a dry etching process, an oxidation process, a wet etching process, a chemical etching process, or a physical process, such as mechanical abrasion. The CMC product 100 includes a ceramic matrix material 34 ("a ceramic matrix"), reinforcing fibers 18, and the one or more elongate channels 24 disposed along the CMC product 100.

In some embodiments, the one or more coated sacrificial fibers 16 may be disposed in a grid pattern to provide elongate channels 24 across the CMC preform 10. For instance, the one or more coated sacrificial fibers 16 may be disposed in a woven grid pattern with the one or more coated sacrificial fibers 16 disposed either in a perpendicular direction or a parallel direction. In certain other embodiments, the one or more coated sacrificial fibers 16 may be disposed in a nonwoven pattern. In such embodiments, it may be beneficial to have the sacrificial fibers fuse together at the intersections. FIGS. 9-12 are schematic views of an exemplary method of forming a CMC product in accordance with one embodiment of the present disclosure. In particular, FIGS. 9-12 illustrate various stages of forming a CMC product in accordance with one embodiment of the present disclosure where the sacrificial fibers are disposed in a grid pattern. Various combinations of these stages may be performed and not all of the stages may be performed in the method.

Figure 12:
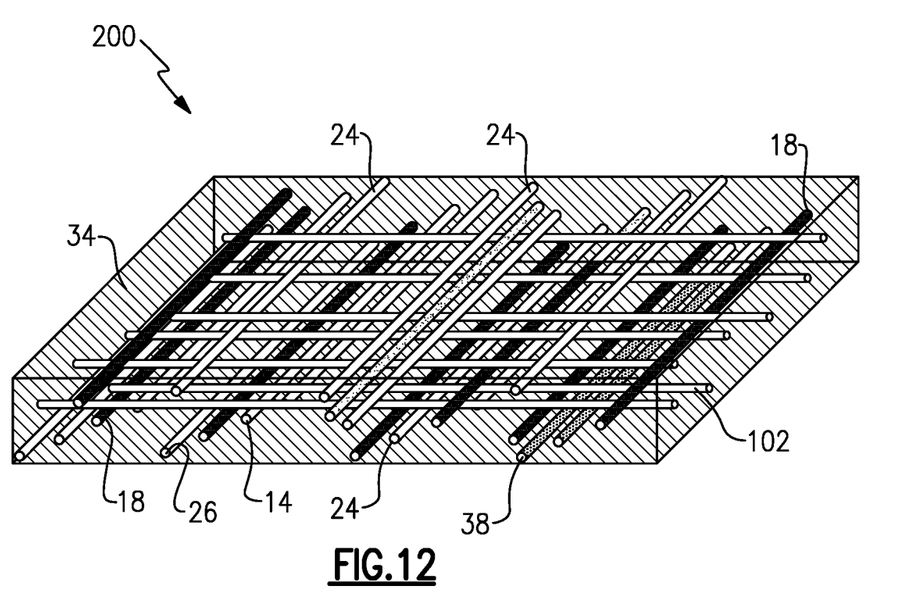
FIG. 12 is a schematic view of a CMC product according to the embodiment of FIG. 8, in accordance with one embodiment of the present disclosure.

Referring now to FIGS. 9-12, FIG. 12 illustrates a CMC product 200 including reinforcing fibers 18 and elongate channels 24. The CMC product 200 illustrated in FIG. 12 may be considered a single ply (e.g., during fabrication the one or more coated sacrificial fibers 16 are layered in 0/90° with reinforcing fibers 18 in between). Multiple layers or "plies" may be used with each ply oriented in various directions as previously described (e.g., third, fourth, and fifth directions, etc.). While FIG. 12 shows an embodiment with a single ply, the present method and materials can be used with a single unidirectional, cross-woven, or nonwoven ply, or multiple unidirectional, cross-woven, and/or nonwoven plies with alternating plies layered in a variety of orientations, or in multidirectional weaves or braids. For instance, in one embodiment, the one or more coated sacrificial fibers 16 may be in the form of a grid where the coated one or more coated sacrificial fibers 16 intersect one another. The one or more coated sacrificial fibers 16 may be woven or configured in a first layer and a second layer, the first and second layers directly touching and in 0/90° configuration making a grid pattern. In other embodiments, the one or more coated sacrificial fibers 16 may form a continuous grid in two dimensions in a single layer. The fibers may be cylindrical or otherwise and result in elongate channels on the same plane. Various configurations can be used without deviating from the intent of the present disclosure.

The one or more sacrificial fibers 12, non-wetting coating 14, slurry 20, reinforcing fibers 18, matrix precursor material 22, pores 28, infiltrant 30, elongate channels 24, and ceramic matrix material 34 as well as other components used in the embodiment illustrated in FIGS. 9-12 may be any of those materials described herein (for example, with relation to FIGS. 1-8) with the accompanying characteristics.

Figure 9:
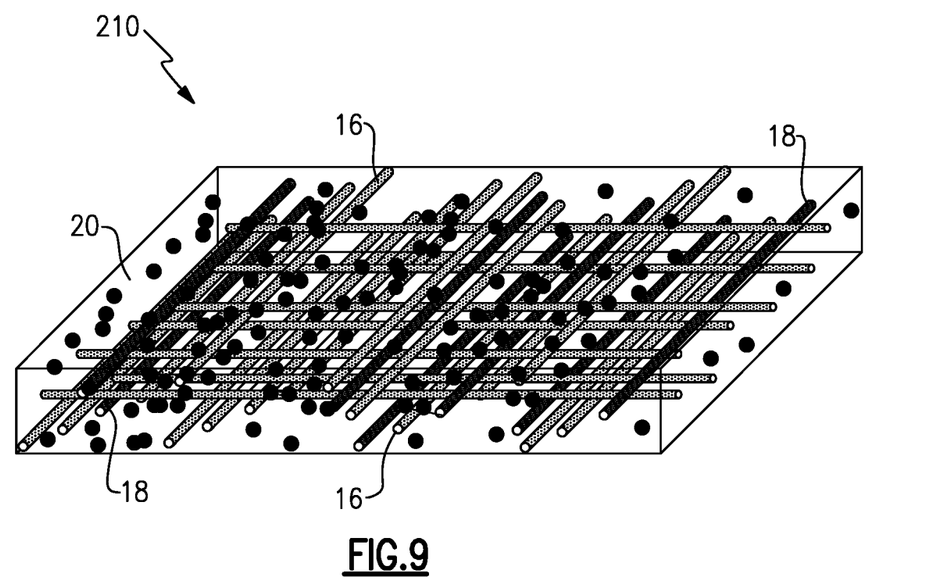
FIG. 9 is a schematic view of a CMC preform according to another embodiment after forming with a slurry, in accordance with one embodiment of the present disclosure.

To form the embodiment illustrated in FIG. 12, the one or more coated sacrificial fibers 16 are disposed in a grid pattern, as illustrated in FIG. 9. That is, the one or more coated sacrificial fibers 16 are disposed to traverse both the length and width of a CMC preform 210 with some of the one or more coated sacrificial fibers 16 disposed in a first direction traversing the length or width and a second set of coated sacrificial fibers 16 disposed in a second direction traversing the length or width, the second direction being perpendicular to the first direction. It may be desired to configure the one or more coated sacrificial fibers 16 along the CMC preform 210 such that the one or more coated sacrificial fibers 16 are throughout the preform 210. A grid pattern may be a suitable method of configuring the one or more coated sacrificial fibers 16 to form the elongate channels 24 (FIG. 12), while minimizing any mechanical/thermal property reduction.

The CMC preform 210 may be prepared in a variety of ways. In some embodiments, the reinforcing fibers 18 and the one or more coated sacrificial fibers 16 may be introduced into a slurry 20 and any other additional desired components to form one or more plies. For instance, in some embodiments, it may be beneficial to include surfactants, dispersing agents, and/or other components in the slurry as well as matrix precursor material for the ceramic matrix.

In one embodiment, once the slurry 20 is incorporated with the reinforcing fibers 18 and the one or more coated sacrificial fibers 16, the CMC preform 112 may be wound on a drum roll to form a tape and then cut into plies. In an alternate embodiment, the one or more coated sacrificial fibers 16 may be introduced at a later stage, where the one or more coated sacrificial fibers 16 are incorporated subsequent to drum winding of the fibers and slurry. One or more plies may be layered with the plies having various relative orientations. For instance, one or more plies may be cross-plied or layered directly over each other such that the fibers are oriented in the same direction. The configuration of the fibers in the tapes and the configuration of the plies may be modified depending on the desired CMC product and desired mechanical properties of the CMC product. In other embodiments, the slurry can be introduced to the fibers via tape casting, screen printing, or any other suitable method. The reinforcing fibers 18 and/or the one or more coated sacrificial fibers 16 within the composite may be unidirectional, cross-woven, and/or nonwoven. The slurry 20 and method of introducing the slurry 20 to the reinforcing fibers 18 and the one or more coated sacrificial fibers 16 may be modified depending on the orientation of the reinforcing fibers 18 and the one or more coated sacrificial fibers 16.

FIG. 9 illustrates the CMC preform 10 after lamination and consolidation, such as by heating and/or compacting, as previously described with regard to the embodiment of FIGS. 1-8, including reinforcing fibers 18, the one or more coated sacrificial fibers 16, and a matrix precursor material, generally similar to the matrix precursor 22 of FIG. 7. The heat and compacting action removes some or all of the solvent of the slurry 20 leaving the matrix precursor material 22 of the slurry 20.

Figure 10:
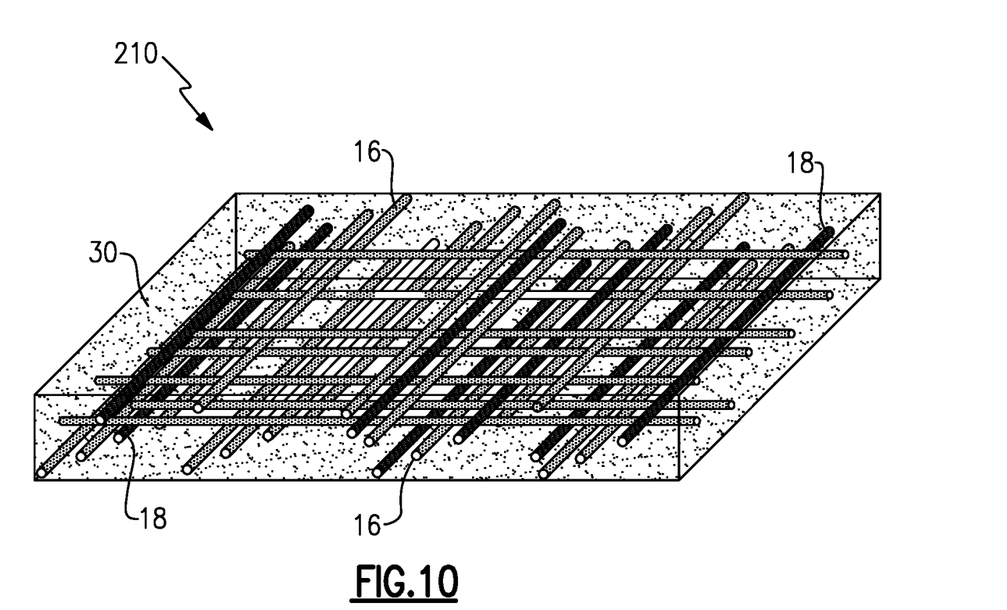
FIG. 10 is a schematic view of a CMC preform after infiltration of an infiltrant, in accordance with one embodiment of the present disclosure.
Figure 11:
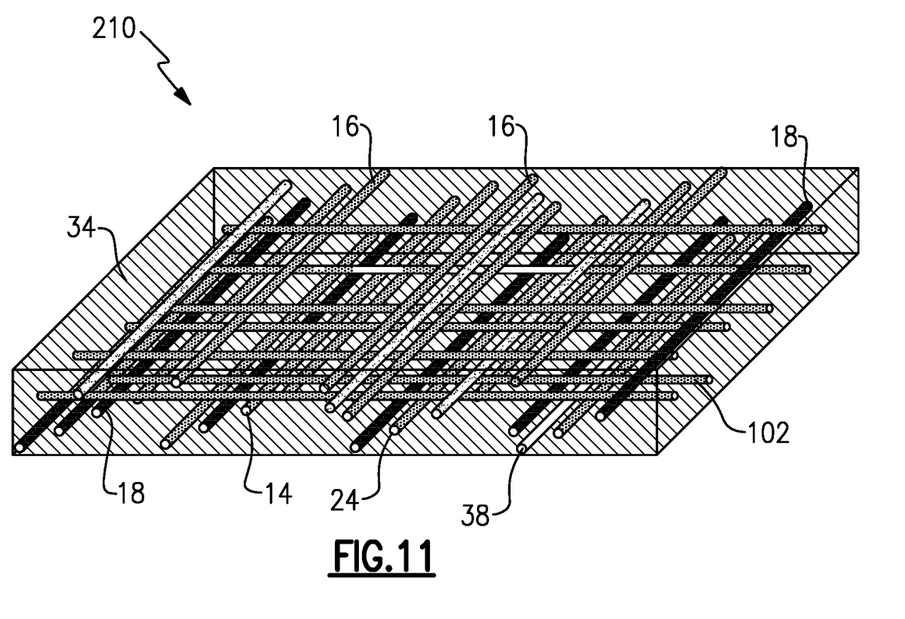
FIG. 11 is a schematic view of a CMC preform after removing some or all of the sacrificial fibers, in accordance with one embodiment of the present disclosure.

In contrast to the embodiment of FIGS. 1-8, the CMC preform 210 undergoes melt infiltration with an infiltrant 30, as illustrated in FIG. 10, prior to removal of the one or more sacrificial fibers 12. Infiltration of the CMC preform 210 with an infiltrant, as previously described with regard to the embodiment of FIGS. 1-7, densifies the CMC preform 210 of FIG. 11.

The one or more sacrificial fibers 12 of the one or more coated sacrificial fibers 16 is next removed, such as through decomposition, to form the elongate channels 24 of FIG. 12 throughout the densified ceramic preform 210. During decomposition, the one or more sacrificial fibers 12 are decomposed while leaving the non-wetting coating 14 adhered to an interior surface 26 of the one or more elongate channels 24. As in the previously described embodiment, the decomposition atmosphere may be oxidizing, reducing, inert, or vacuum. The reinforcing fibers 18 are maintained in the densified CMC preform 210.

In the embodiment illustrated in FIG. 12, the elongate channels 24 traverse the length and width of the final CMC product 200 such that a plurality of functional features, such as cooling channels, are formed in both directions along the CMC product 200. Infiltration of the CMC preform 210 with the infiltrant, as previously described with regard to the embodiment of FIGS. 1-8, forms the densified CMC product 200 (FIG. 12). After removal of the one or more sacrificial fibers 12, the CMC product 200 may be further densified, heated to anneal, cooled, machined, inspected, or combinations thereof. In some embodiments, an external coating may be applied. The CMC product 200 includes a ceramic matrix material 34 ("a ceramic matrix"), reinforcing fibers 18, and one or more elongate channels 24 disposed along the CMC product 200.

Figure 13:
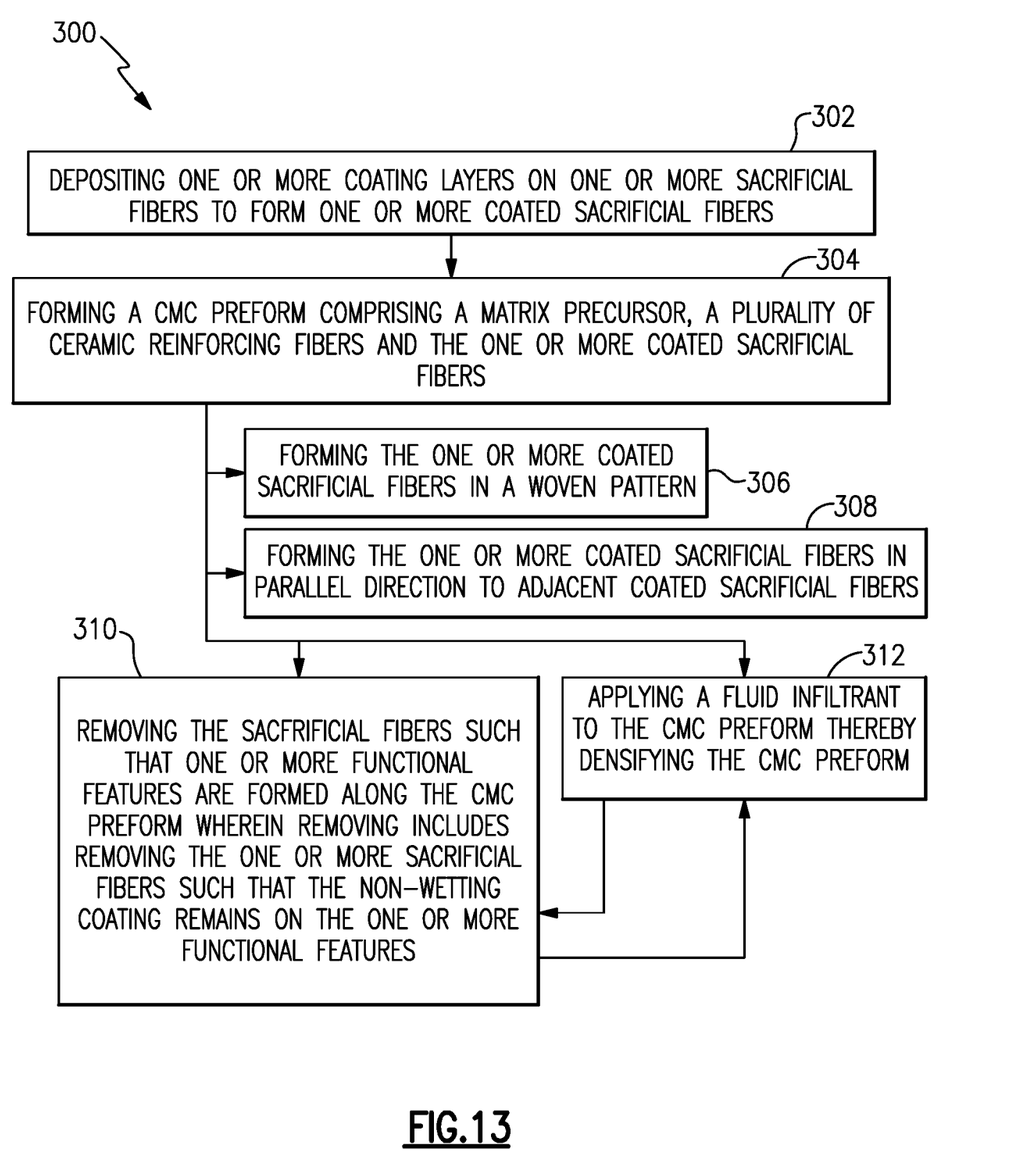
FIG. 13 is a flowchart of an exemplary method of forming a CMC product in accordance with one embodiment of the present disclosure.

FIG. 13 is a flowchart of an exemplary method of forming a CMC product in accordance with one embodiment of the present disclosure. The method 300 illustrated in FIG. 13 includes depositing a one or more coating layers on one or more sacrificial fibers to form one or more coated sacrificial fibers, in a step 302; forming a CMC preform comprising a matrix precursor, reinforcing fibers, and the one or more coated sacrificial fibers, in a step 304, which may also include compacting the CMC preform. In some embodiments, forming the CMC preform comprises forming the coated sacrificial fibers in a woven pattern, in a step 306, while in some embodiments, forming the CMC preform comprises forming the coated sacrificial fibers in direction parallel to adjacent sacrificial fibers, in a step 308. In an embodiment, the one or more sacrificial fibers are next removed, such that one or more functional features are formed along the CMC preform, in a step 310, wherein removing includes removing the one or more sacrificial fibers and any additional sacrificial coating material such that the non-wetting coating remains on the one or more functional features. Finally, a fluid infiltrant (such as a melt infiltrant) is caused to infiltrate the CMC preform, in a step 312, thereby densifying the CMC preform forming a CMC product.

In an alternate embodiment, the fluid infiltrant is caused to infiltrate the CMC preform, in a step 312, prior to removal of the one or more sacrificial fibers and any sacrificial coating material present, in a step 310. Subsequent to infiltration, the one or more sacrificial fibers and any sacrificial coating material present is removed, such that one or more functional features are formed along the CMC preform, in the step 310.

In an embodiment, the remaining non-wetting solution may be removed by a dry etching process, an oxidation process, a wet etching process, or a chemical etching process. The slurry/matrix precursor, reinforcing fibers, sacrificial fibers, non-wetting coating, infiltrant, as well as other components used in the method 300 may be any of those described herein. In an embodiment, the step of removing the sacrificial fibers, and any sacrificial coating layer present, includes removing by one or more of: (i) pyrolysis prior to applying the fluid infiltrant to the CMC preform; (ii) by melting prior to applying the fluid infiltrant to the CMC preform; (iii) by physically extraction prior to applying the fluid infiltrant to the CMC preform; (iv) by oxidation subsequent to applying the fluid infiltrant to the CMC preform, and (v) by dissolution subsequent to applying the fluid infiltrant to the CMC preform.

The method 300 may include additional components or actions and may include repeating one or more of the previously described actions. Various alternative configurations of the method 300 may be used without deviating from the intent of the present disclosure. The CMC product may be further processed or machined as needed.

EXAMPLES

Figure 14:
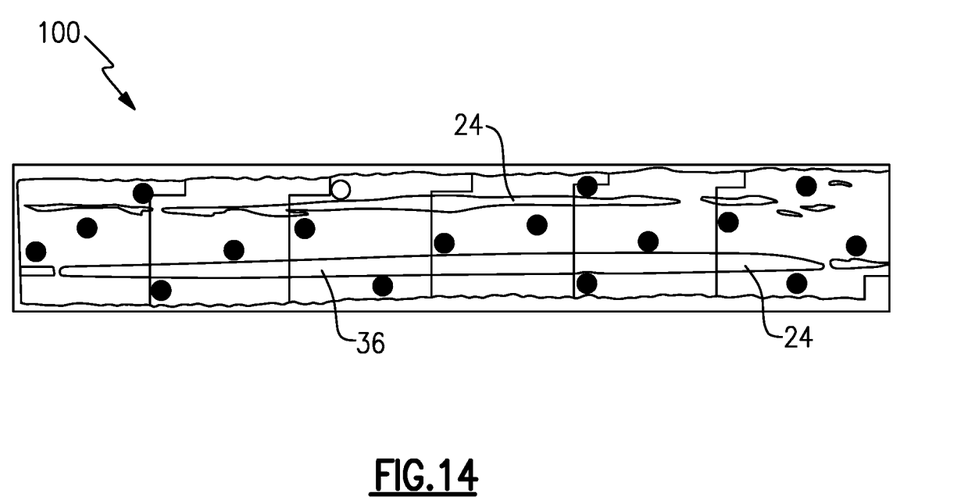
FIG. 14 is a schematic showing the cross section of a CMC product in accordance with the Example described below.

A non-wetting coating, such as boron nitride, was disposed on nylon fibers (8 mils (203 μm) in diameter) by dragging the fibers through the non-wetting coating. The coated nylon fibers were wound into a prepreg ceramic tape with 50 mils (1.27 mm) spacing. The tape was cut and layered in a 0°/90° configuration panel. The panel was heated and compressed to remove solvent. The panel was then pyrolyzed to decompose the nylon fibers and form elongate channels traversing the panel. During the pyrolyzing step, the non-wetting coating remains on an interior surface of the elongate channels that are formed. Melt infiltration of molten silicon was then used to infiltrate the panel. The non-wetting solution preventing the molten silicon from deposition on the interior of the elongate channels. Portions of the molten silicon reacted to form the ceramic matrix. FIG. 14 is a schematic showing a portion of the cross section of the CMC product 100 and illustrating a plurality of elongate channels 24, and more particularly cooling channels 36, formed therein according to the method disclosed herein.

While the disclosure has been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contain the named components and no other components that significantly adversely affect the basic and novel features disclosed), and embodiments wherein the coating compositions "consist of" the named components (i.e., contain only the named components except for contaminants which are naturally and inevitably present in each of the named components).

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of forming a ceramic matrix composite (CMC) product comprising, in order:
    depositing one or more coating layers, of which at least one is a non-wetting coating, on one or more sacrificial fibers to form one or more coated sacrificial fibers;
    forming a CMC preform comprising a matrix precursor, a plurality of reinforcing fibers and the one or more coated sacrificial fibers;
    removing the one or more sacrificial fibers such that one or more functional features are formed along the CMC preform, wherein removing includes removing the one or more sacrificial fibers such that the non-wetting coating remains on the one or more functional features;
    applying a fluid infiltrant to the CMC preform thereby densifying the CMC preform,
    wherein the non-wetting coating is adapted to inhibit flow of the fluid infiltrant to the one or more functional features and deposition thereon, during melt infiltration.

2. The method according to claim 1, wherein the one or more functional features are elongate channels.

3. The method according to claim 2, wherein the one or more elongate channels are cooling fluid flow channels.

4. The method according to claim 1, wherein removing the one or more sacrificial fibers comprises:
    heating the CMC preform to decompose the sacrificial fibers,
    wherein the one or more sacrificial fibers are formed of material with a decomposition temperature of about 200° C. to about 700° C.

5. The method according to claim 1, wherein the one or more coating layers comprise one or more sacrificial polymer coatings and the non-wetting coating.

6. The method according to claim 5, wherein removing the one or more sacrificial fibers comprises:
    heating the CMC preform to decompose the one or more sacrificial polymer coatings; and
    extracting the one or more sacrificial fibers.

7. The method according to claim 1, wherein the applying the non-wetting coating to the one or more sacrificial fibers includes painting, spraying, depositing, dipping or sputtering an infiltrant stop off material.

8. The method according to claim 1, wherein the non-wetting coating comprises one or more materials selected from the group consisting of a boron, and an oxide.

9. The method according to claim 1, wherein the method further includes removing the non-wetting coating using a dry etching process, an oxidation process, a wet etching process, mechanical abrasion or a chemical etching process.

10. The method according to claim 1, wherein the infiltrant comprises silicon or a silicon alloy.

11. The method according to claim 1, wherein the one or more coated sacrificial fibers comprise one or more sacrificial materials that are removed by one or more of: (i) pyrolysis prior to applying the fluid infiltrant to the CMC preform, (ii) melting prior to applying the fluid infiltrant to the CMC preform, and (iii) physically extraction prior to applying the fluid infiltrant to the CMC preform.

12. The method according to claim 1, wherein the one or more sacrificial fibers comprise a semi-crystalline polymer, a cross-linked polymer, an amorphous polymer, a metal, a ceramic or combinations thereof.

13. The method according to claim 1, wherein the one or more sacrificial fibers comprise one or more of crosslinked phenolic resin, crosslinked poly(vinyl butyral), polyamides, polyesters, acrylics and combinations thereof.

14. The method according to claim 1, wherein the plurality of reinforcing fibers comprise one or more of carbon, silicon carbide, silicon nitride, silicon oxycarbides, silicon oxynitrides, silicides, aluminum oxide, silicon dioxide, yttrium aluminum garnet, aluminosilicates, zirconium carbide, hafnium carbide, SiNC, SiBNC, and boron carbide.

15. The method according to claim 1, wherein forming the CMC preform comprises forming the one or more coated sacrificial fibers in one of a woven pattern or in a parallel direction to adjacent coated sacrificial fibers within a ply.

16. A method of forming a ceramic matrix composite (CMC) product comprising, in order:
depositing one or more coating layers, of which at least one is a non-wetting coating, on one or more sacrificial fibers;
forming a CMC preform comprising a matrix precursor, a plurality of ceramic reinforcing fibers and the one or more coated sacrificial fibers;
removing the one or more sacrificial fibers such that one or more elongate channels are formed along the CMC preform, wherein removing includes removing the one or more sacrificial fibers such that the non-wetting coating remains on an interior surface of the one or more elongate channels; and
applying a fluid infiltrant to the CMC preform thereby densifying the CMC preform and forming the CMC product,
wherein the non-wetting coating is adapted to inhibit flow and deposition of the fluid infiltrant to the one or more elongate channels during melt infiltration.

17. The method according to claim 16, wherein the one or more coating layers comprise a sacrificial polymer coating and the non-wetting coating.

18. The method according to claim 16, wherein the applying the non-wetting coating to the one or more sacrificial fibers includes painting, spraying, depositing, dipping or sputtering an infiltrant stop off material.

19. The method according to claim 16, wherein the non-wetting coating comprises a material selected from the group consisting of a boron, an oxide, or combinations thereof.

20. The method according to claim 16, wherein removing the one or more sacrificial fibers comprises:
heating the CMC preform to decompose the one or more sacrificial fibers,
wherein the one or more sacrificial fibers are formed of material with a decomposition temperature of about 200° C. to about 650° C.

21. A method of forming a ceramic matrix composite (CMC) product comprising, in order:
forming a CMC preform comprising a matrix precursor, a plurality of ceramic reinforcing fibers and one or more sacrificial fibers having a coating comprised of boron nitride (BN) deposited thereon, wherein the one or more sacrificial fibers have an average diameter of about 10 µm to 1000 µm, wherein forming the CMC preform comprises forming the one or more sacrificial fibers in one of a woven pattern or nonwoven pattern;
removing the one or more sacrificial fibers such that elongate channels are formed along the CMC preform, wherein removing includes removing the one or more sacrificial fibers such that the coating remains on an interior surface of the elongate channels; and
applying a melt infiltrant comprised of one of a silicon or silicon alloy to the CMC preform thereby densifying the CMC preform and forming the CMC product,
wherein the coating is adapted to inhibit flow of the melt infiltrant to a cavity formed within each of the one or more elongate channels and deposition thereon, during the applying of the melt infiltrant.

* * * * *